United States Patent
Schmidt et al.

(10) Patent No.: US 10,554,472 B2
(45) Date of Patent: Feb. 4, 2020

(54) CONCEPT FOR ENHANCING PERFORMANCE IN BACKSCATTER SYSTEMS OR LOAD SYSTEMS

(71) Applicant: Fraunhofer-Gesellschaft zur Foerderung der angewandten Forschung e.V., Munich (DE)

(72) Inventors: Philip Schmidt, Attendorn (DE); Gerd Vom Boegel, Wuelfrath (DE); Frederic Meyer, Erndtebrueck (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/685,177

(22) Filed: Aug. 24, 2017

(65) Prior Publication Data
US 2018/0062905 A1    Mar. 1, 2018

(30) Foreign Application Priority Data
Aug. 26, 2016   (DE) .................. 10 2016 216 071

(51) Int. Cl.
*H04L 27/36* (2006.01)
*H04B 1/56* (2006.01)
*H04L 5/14* (2006.01)

(52) U.S. Cl.
CPC ............. *H04L 27/361* (2013.01); *H04B 1/56* (2013.01); *H04L 5/143* (2013.01)

(58) Field of Classification Search
None
See application file for complete search history.

(56) References Cited

U.S. PATENT DOCUMENTS

| | | | | |
|---|---|---|---|---|
| 6,075,973 A | * | 6/2000 | Greeff | G06K 7/0008 340/10.1 |
| 2002/0015436 A1 | * | 2/2002 | Ovard | G06K 7/0008 375/130 |
| 2004/0066752 A1 | * | 4/2004 | Hughes | G06K 19/0723 370/252 |
| 2005/0110612 A1 | * | 5/2005 | Carrender | G06K 7/0008 340/10.1 |
| 2009/0091454 A1 | * | 4/2009 | Tuttle | G01S 11/10 340/572.7 |
| 2009/0096580 A1 | * | 4/2009 | Paananen | G06F 21/35 340/10.1 |

(Continued)

FOREIGN PATENT DOCUMENTS

EP    1810210 B1    7/2008

OTHER PUBLICATIONS

Finkenzeller, K., "RFID Handbuch—Grundlagen und praktische Anwendungen von Transpondern, kontaktlosen Chipkarten und NFC", 7th edition, Hanser Verlag, 2015.

(Continued)

*Primary Examiner* — Otis L Thompson, Jr.
(74) *Attorney, Agent, or Firm* — Michael A. Glenn; Perkins Coie LLP

(57) ABSTRACT

Embodiments relate to a transceiver configured to send a send signal to a radio module having a backscatter modulator or a load modulator, the send signal including two different signal portions based on mutually independent signals or signal sources.

16 Claims, 5 Drawing Sheets

(56) References Cited

U.S. PATENT DOCUMENTS

| | | | | |
|---|---|---|---|---|
| 2013/0043887 A1* | 2/2013 | Ziolkowski | ............... | F17D 5/00 |
| | | | | 324/649 |
| 2014/0248837 A1* | 9/2014 | Zhou | .................... | H04B 1/0458 |
| | | | | 455/41.2 |
| 2014/0357202 A1* | 12/2014 | Malarky | ............ | G06K 7/10009 |
| | | | | 455/84 |
| 2015/0097654 A1* | 4/2015 | Mo | ..................... | G06K 7/10009 |
| | | | | 340/10.4 |
| 2016/0061751 A1* | 3/2016 | Carr | ..................... | G01N 27/026 |
| | | | | 324/637 |
| 2016/0094933 A1* | 3/2016 | Deyle | ................. | H04L 27/3455 |
| | | | | 375/262 |
| 2016/0365890 A1* | 12/2016 | Reynolds | ................ | H04B 1/525 |
| 2017/0010385 A1* | 1/2017 | Englich | .................... | G01V 8/16 |
| 2018/0042527 A1* | 2/2018 | Rawicz | ................. | A61B 3/0008 |
| 2018/0058982 A1* | 3/2018 | Hartog | .................... | G01V 1/226 |
| 2018/0129839 A1* | 5/2018 | Schmidt | ............... | G06K 7/0008 |
| 2018/0259385 A1* | 9/2018 | Cedilnik | ................. | G01H 9/004 |
| 2018/0269909 A1* | 9/2018 | Reynolds | ................. | H04B 1/04 |

OTHER PUBLICATIONS

Sabharwal, A. et al., "In-Band Full-Duplex Wireless: Challenges and Opportunities", May 2014, pp. 1-22.

\* cited by examiner

CONCEPT FOR ENHANCING PERFORMANCE IN BACKSCATTER SYSTEMS OR LOAD SYSTEMS

CROSS-REFERENCE TO RELATED APPLICATIONS

This application claims priority from German Patent Application No. 102016216071.0, which was filed on Aug. 26, 2016, and is incorporated herein in its entirety by reference.

Embodiments of the present invention relate to a transceiver and, in particular, to a transceiver for communication with a radio module having a backscatter modulator or a load modulator. Further embodiments relate to a method for enhancing performance in backscatter systems.

BACKGROUND OF THE INVENTION

In RFID systems (RFID=Radio-Frequency Identification, i.e., identification with the aid of electromagnetic waves, e.g., in the UHF range (UHF=Ultra High Frequency), or with the aid of magnetic coupling, e.g., in the LF range (LF=Low Frequency) or in the HF range (HF=High Frequency)), there is generally only a limited and low amount of energy available on the side of the transponder. For this reason, in transponder systems operating with electromagnetic coupling (UHF and higher frequencies), the backscatter modulation is used for transmitting the data from the transponder to the reading device (uplink). This is a modulation method wherein the radar cross-section of the transponder is varied depending on the transponder data rate f_Tag. The radar cross-section contains the geometrical dimensions of the transponder as well as the reflection factor indicating which amount of the incident wave (in this case, of the carrier) is radiated back, or reflected. This backscatter modulation results in a spectral characteristic in which the "backscattered" transponder signal is, from a spectral perspective, very close to the carrier signal, see FIG. 5.

In detail, FIG. 5 shows a diagram of a fundamental illustration of the energy of a backscatter signal 10 and carrier signal 12 across the frequency in the classical transmission in a transponder system. In this case, the ordinate describes an amount of an amplitude of the signals and the abscissa describes the time.

As a result of this characteristic, detecting and separating the transponder signal in the receiver module is not trivial since filtering the transponder signal directly from the high-frequency receive signal is not possible because the steep-edge, or narrowband, filters cannot be realized or may only be realized using great effort. A further problem in receiving such backscatter signals is the amplitude ratio of the transponder signal compared to the carrier signal (SCR=Signal-to-Carrier ratio) and the noise (SNR=Signal-to-Noise ratio) which does not allow a direct demodulation of the transponder signal. Amplifying the transponder signal by means of a low signal amplifier (LNA) is not possible since the substantially larger carrier signal would lead to an overdrive of the LNA so that there may be no amplification of the transponder signal in the RF path (RF=Radio Frequency). However, filtering and amplifying is possible in the base band range so that homodyne receiving architectures (direct mix receivers) are used as a standard. The advantage of this approach is that, due to the missing input filtration and pre-amplification, only signals having a good SNR are decodable and, thus, range is given away. In [1], the entire underlying problem is described in detail.

In [1], conventional technology for solving the described central issue is extensively illustrated. Fundamentally, three solutions are described therein.

In current standard reading devices operating in the UHF frequency range, due to the above-described problems, homodyne receiver concepts are used, i.e., the received signal is directly downmixed into the base band. By this, the distance between the transponder signal and the carrier frequency is significantly increased and dimming these unwanted signal portions by filtering is easily realizable.

Further, there are two additional improved solution approaches in the uplink which open up potential for improvement and are found in the literature and in the practical use.

In the first solution approach, a so-called auxiliary carrier is used. Here, an additional signal source with a frequency f_HT is switched depending on the transponder data rate f_Tag whereby the transponder signal is spectrally shifted by ±f_HT. In this case, the transponder signal may be shifted to the extent that it may easily be filtered out of the receive signal in the RF path of the reading device, without the carrier signal having an interfering influence. In this case, the use of an LNA (Low Noise Amplifier) for amplifying the transponder signal would also be conceivable after filtering. The problem with this solution approach is that the additional signal source significantly increases the energy demand of the transponder, resulting in a significantly lower energy range, and the resulting reading range of the transponder may be lower as compared to not using an auxiliary carrier.

The second solution approach with respect to the problem is based on the so-called carrier suppression. In this case, the amplitude of the carrier signal is decreased by hardware or software or a combination of hardware and software. In this approach, the inverse carrier signal is added to the receive signal. The improved SCR (ratio of transponder signal to carrier signal) allows an error-free demodulation of the transponder signal, also enabling the use of an LNA for amplifying in the RF path of the reading device.

SUMMARY

According to an embodiment, a transceiver may have: a transmitter configured to send a send signal to a radio module having a backscatter modulator or a load modulator; the send signal having two different signal portions based on mutually independent signals.

According to another embodiment, a system may have: an inventive transceiver; and a radio module having a backscatter modulator or a load modulator, the radio module being configured to receive the send signal and to send out a backscatter-modulated or load-modulated signal as the response signal.

According to another embodiment, a method may have the steps of: sending a send signal to a radio module having a backscatter modulator or a load modulator, the send signal having two different signal portions based on mutually independent signal sources.

The invention provides a transceiver configured to send a send signal to a radio module comprising a backscatter modulator or a load modulator, the send signal comprising two different signal portions which are based on mutually independent signals or signal sources.

The invention further provides a system having a transceiver and a radio module. The transceiver is configured to send a send signal to a radio module comprising a backscatter modulator or a load modulator, the send signal comprising two different signal portions which are based on mutually independent signals or signal sources. The radio module comprises a backscatter modulator or a load modulator, the radio module being configured to receive the send signal and to send out a backscatter-modulated or load-modulated signal, The invention further provides a method having a step of sending a send signal to a radio module comprising a backscatter modulator or a load modulator, the send signal comprising two different signal portions based on mutually independent signal sources.

Advantageous further developments are to be found in the impending patent claims.

In embodiments, the send signal may comprise two different signal portions based on two mutually independent signals.

The two mutually independent signals may be provided by two mutually independent signal sources.

In embodiments, the transceiver may be configured to combine the two mutually independent signals in order to obtain the send signal.

In embodiments, the two mutually independent signals may be modulated independently of each other.

In embodiments, a first signal of the two mutually independent signals may be provided by a first signal source, while a second signal of the two mutually independent signals may be provided by a second signal source. The first signal source and the second signal source may be mutually independent.

In embodiments, data to be transmitted to the radio module may only (or exclusively) be modulated onto the first signal.

For example, data to be transmitted to the radio module is not modulated onto the second signal. In other words, no data to be transmitted to the radio module is modulated onto the second signal.

In embodiments, the first signal may be a carrier signal onto which data to be transmitted to the radio module comprising the backscatter modulator or the load modulator is modulated, while the second signal may serve for supporting carrier suppression.

In embodiments, a data rate of the first signal may be smaller than or equal to a data rate of the second signal.

In embodiments, the first signal may be amplitude-modulated.

In embodiments, the second signal may be phase-modulated, frequency-modulated or OFDM-modulated.

In embodiments, the transceiver may be configured to obtain the first signal from a first signal source and to obtain the second signal from a second signal source, the first signal source and the second signal source being mutually independent.

For example, the transceiver may comprise the first signal source and the second signal source. Alternatively, the transceiver may be connected to the first signal source and the second signal source, i.e., the first signal source and the second signal source may be embodied externally to the transceiver. Obviously, the transceiver may also comprise one of the two signal sources and may be connected to the other one of the two signal sources.

In embodiments, the transceiver may be configured to specify a modulation frequency to the radio module comprising a backscatter modulator or a load modulator, a bandwidth of a signal source of the send signal being at least twice as high as a data rate of the radio module having the backscatter modulator or the load modulator.

In embodiments, the transceiver may comprise a receiver configured to receive a receive signal, the receive signal including a superimposition of the send signal, and a response signal sent out by the radio module in response to the send signal.

In embodiments, the send signal may overlay the response signal of the radio module having the backscatter modulator or the load modulator in the spectral range in terms of amplitude.

In embodiments, the receiver may be configured to synchronize the receive signal using a reference signal, the reference signal being at least partly based on the send signal or the second signal.

For example, the reference signal may correspond to the send signal or may be an amplified or attenuated version of the send signal or the second signal in terms of amplitude.

In embodiments, the receiver may further be configured in order to offset the receive signal and the reference signal against each other in order to obtain the response signal sent out by the radio module.

In embodiments, the receiver may further be configured to demodulate the response signal in order to obtain a data signal.

The data signal may correspond to the data signal with which the signal received by the radio module is modulated in the backscatter modulator or the load modulator of the radio module.

In embodiments the transceiver may be a reading device such as a reading device for reading out radio tags, or radio labels, (transponders). For example, the transceiver may be an RFID reading device (Radio-Frequency Identification, i.e., identification with the aid of electromagnetic waves).

In embodiments, the radio module may be a radio tag, or a radio label, (transponder). For example, the radio module may be an RFID transponder.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
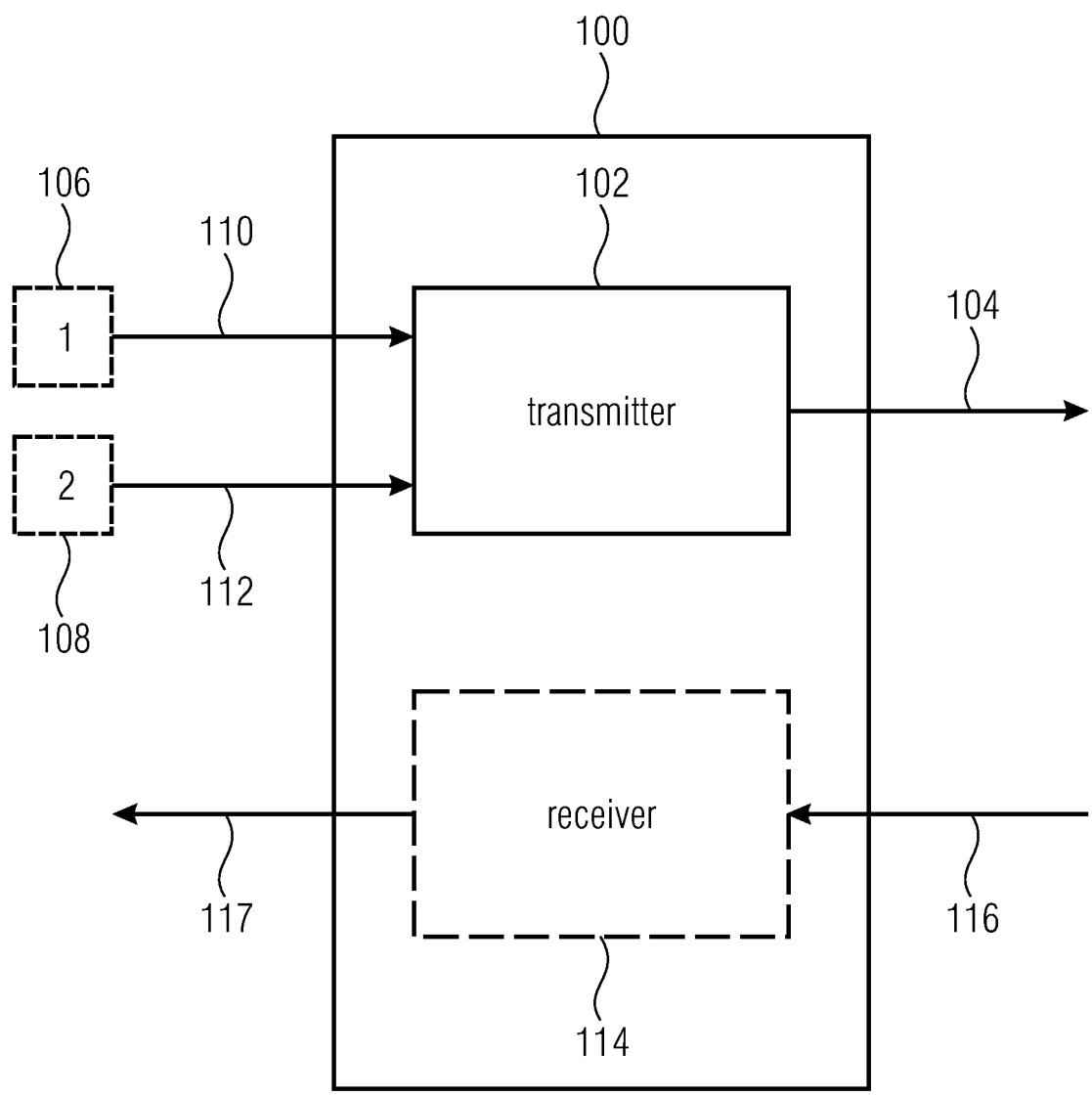
FIG. 1 shows a schematic block circuit diagram of a transceiver according to an embodiment of the present invention.

In the following description of the embodiments of the invention, the same or equivalent elements are denoted by the same reference numerals so that their description in the different embodiments is interchangeable.

FIG. 1 shows a schematic block circuit diagram of a transceiver 100 according to an embodiment of the present invention. The transceiver 100 includes a transmitter 102 configured to send a send signal 104 to a radio module comprising a backscatter modulator or a load modulator, the send signal 104 comprising two different signal portions based on two mutually independent signals 110 and 112.

The two mutually independent signals 110 and 112 may be provided by two mutually independent signal sources 106 and 108.

In detail, the first signal 110 may be provided by a first signal source 106, while the second signal 112 may be provided by a second signal source 108. The first signal source 106 and the second signal source 108 may be mutually independent, i.e., the same may be two separate signal sources providing mutually independent signals. Thus, a change of a parameter of a signal source 106 (or 108) only leads to a change of a characteristic (e.g., amplitude, phase, modulation) of the signal 110 (or 112) provided by the signal source 106 (or 108), however, it does not lead to a change of a characteristic (e.g., amplitude, phase, modulation) of the signal 112 (or 110) provided by the other signal source 108 (or 106).

The first signal 110 and the second signal 112 may be modulated independently of each other. Thus, the first signal may be modulated with a first modulation type, while the second signal may be modulated with a second modulation type, the first modulation type and the second modulation type being different.

For example, the first signal may be amplitude-modulated, while the second signal may be phase-modulated, frequency-modulated, or OFDM-modulated (OFDM=Orthogonal Frequency-Division Multiplexing).

In this case, data to be transmitted to the radio module may only (or exclusively) be modulated onto the first signal 110. Thus, data to be transmitted to the radio module is not modulated onto the second signal 112.

Thus, the first signal 110 may be a signal onto which data to be transmitted to the radio module having the backscatter modulator or the load modulator is modulated. The second signal 112 may serve for supporting carrier suppression. Together, the first signal 110 and the second signal 112 may form the carrier signal. In other words, the carrier signal (or send signal) 104 may be a combination of the first signal 110 and the second signal 112.

The transceiver 100 may be configured to combine the first signal 110 and the second signal 112 in order to obtain a combined signal, the send signal 104 being based on the combined signal.

For example, the send signal 104 may be an amplified version of the combined signal and/or a version of the combined signal shifted in the RF range. The signal combiner may be connected upstream of the transmitter 102 or may be integrated into the transmitter 102.

The transceiver 100 may further comprise a receiver 114 configured to receive a receive signal 116, the receive signal 116 including a superimposition of the send signal and a response signal sent out by the radio module in response to the send signal.

The receiver 114 may be configured to synchronize the receive signal 116 using a reference signal, the reference signal being (at least partially) based on the send signal 104 or the second signal 112.

For example, the reference signal may correspond to the send signal or it may be an amplified or attenuated version of the send signal 104 or the second signal 112 in terms of amplitude.

The receiver 114 may further be configured to offset the receive signal 116 and the reference signal against each other in order to obtain the response signal sent out by the radio module.

The receiver 114 may further be configured to demodulate the response signal in order to obtain a data signal 117. The data signal may correspond to the data signal with which the signal received by the radio module is modulated in the backscatter modulator or load modulator of the radio module.

In the following, detailed embodiments of the transceiver 100 will be described on the basis of the communication system shown in FIG. 2.

Figure 2:
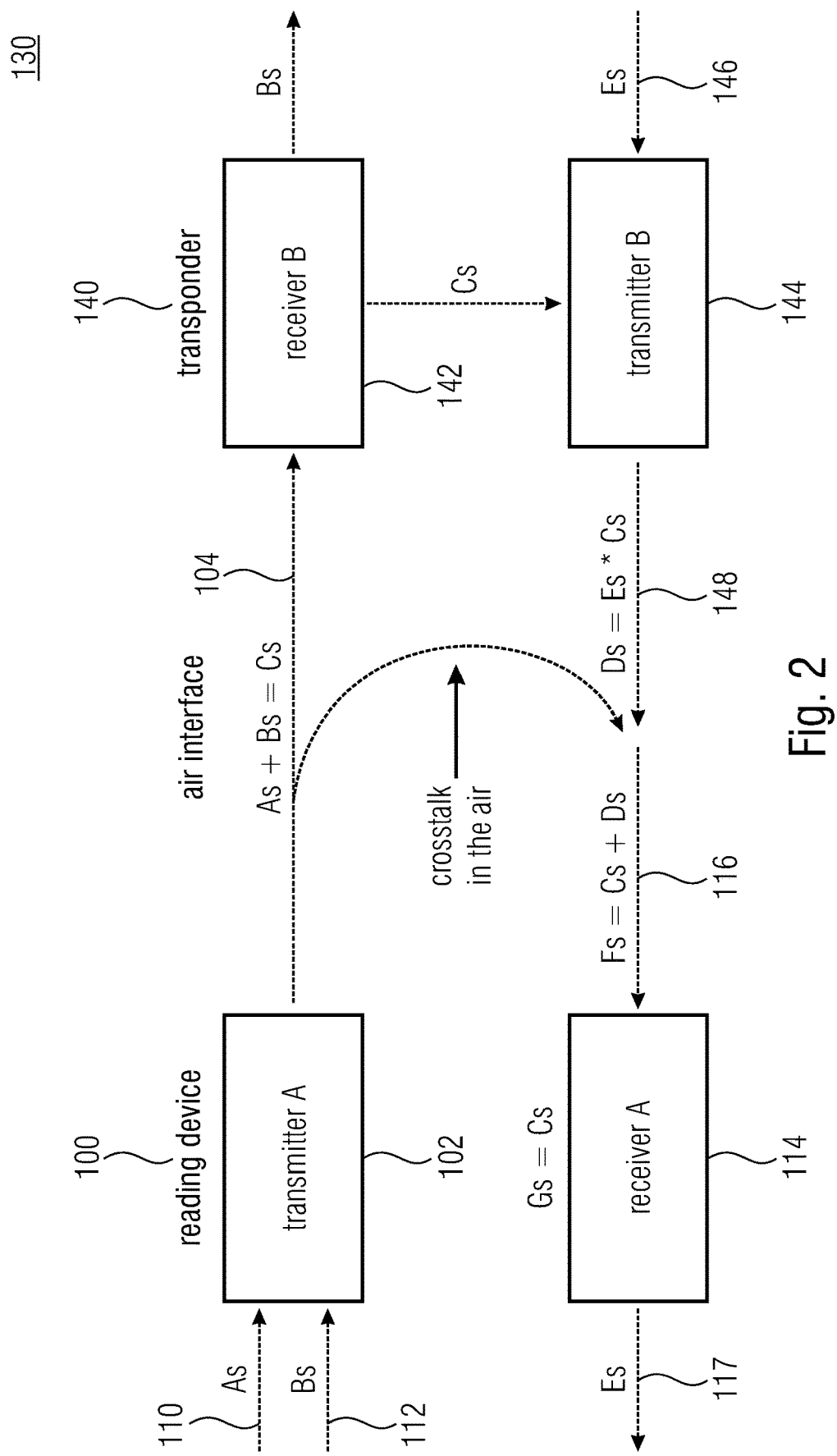
FIG. 2 shows a schematic block circuit diagram of a system comprising the transceiver shown in FIG. 1 and a radio module according to an embodiment of the present invention.

FIG. 2 shows a schematic block circuit diagram of a communication system 130 having the transceiver 100 shown in FIG. 1 and a radio module 140 having a backscatter modulator or a load modulator.

As can be seen in FIG. 2, the transceiver 100 may be the reading device and the radio module 140 may be a transponder. The reading device 100 may include the transmitter 102 and the receiver 114, which are denoted in the following as transmitter A and receiver A. The transponder 140 may include a transmitter 142 and a receiver 144, which are denoted in the following as transmitter B and receiver B.

Thus, the communication system (or transmission system) 130 may be a wireless communication system having a backscatter modulation principle or a load modulation principle for transponders.

In the downlink, a signal Cs (send signal 104) having the signal portions As and Bs may be sent out by the transmitter A (102). This signal Cs (send signal 104) may be formed from two different independent signal sources 106, 108 (see FIG. 1) and may be mixed using different modulation types. One of the two signals—e.g., As (first signal 110)—may represent the carrier onto which data for the transmission in the downlink may also be modulated. If As (first signal 110) is the carrier, Bs (second signal 112) may be any signal which may be used for carrier suppression in the following. The two data sources As (106) and Bs (108) (see FIG. 1) may comprise the same or different data rates and may be incoherent. The ratio of the data rates with respect to each other has an influence on the stability of the carrier suppression, as explained below in detail.

In the receiver B (142), the receive signal Cs may be supplied to the backscatter modulator in the transmitter B 144 and may be modulated with the data signal Es (146). It represents the data signal with which data is transmitted in the uplink from B (transponder 140) to A (reading device 100). Transmitter B (144) radiates the resulting signal Ds (response signal 148).

Now, at the receiver A 114, the signal Fs (receive signal 116) which includes the signals Cs (send signal 104) and Ds (response signal 148) transmitted by the transmitter A (102) and transmitter B (144) is received. The signal Fs (receive signal 116) now received maybe synchronized in the receiver A (114) in terms of frequency and phase so that an improved (or even optimum) demodulation is possible. Subsequently, this signal Fs (receive signal 116) may be synchronized with a signal Gs (reference signal) which is identical to Cs (send signal 104). Subsequently, Fs (receive signal 116) and Gs (reference signal) may be offset against each other so that the signal Ds (response signal 148) sent out by transmitter B (144) (exclusively) results. Finally, by means of a standard backscatter demodulator or load demodulator, the signal Es (data signal 117) may be recaptured from the signal Ds.

For synchronization, additional redundancy, e.g., training sequences may be added to the raw data streams of the data sources As, Bs and Es.

Measurements have shown that in-band full duplex communication is realizable with this method. The spectral characteristic of the in-band communication is illustrated in FIG. 3.

Figure 3:
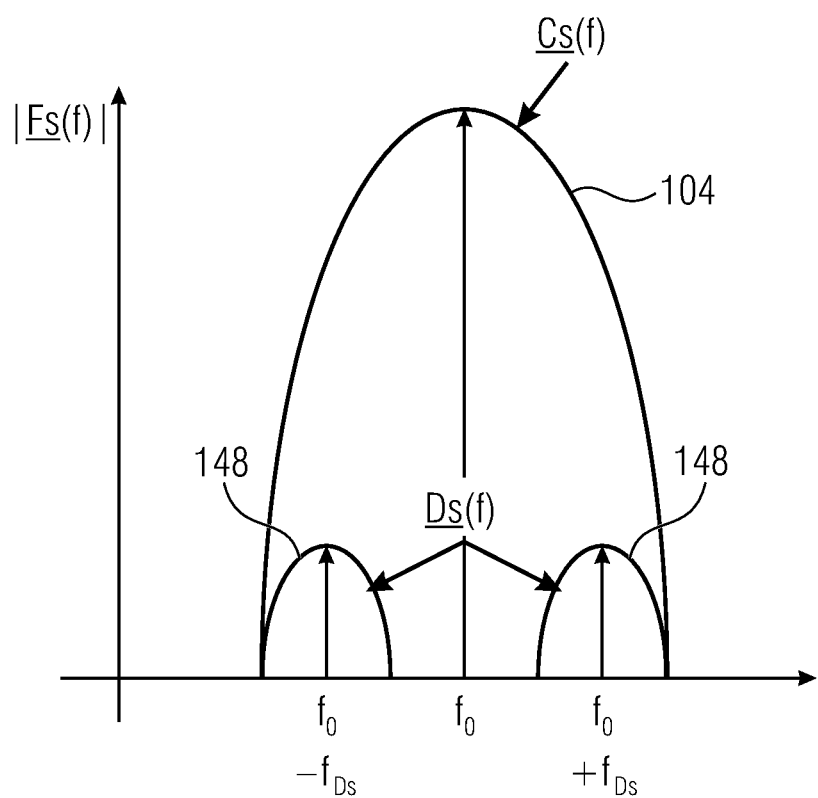
FIG. 3 shows in a diagram an amount of amplitude of the send signal and of the response signal sent out by the radio module in response to the send signal according to an embodiment of the present invention.

In detail, FIG. 3 shows in a diagram an amount of amplitude of the send signal 104 and of the response signal 148 (backscatter signal) sent out by the radio module in response to the send signal according to an embodiment. In this case, the ordinate describes an amount of amplitude and the abscissa describes the time.

As can be seen in FIG. 3, an amplitude of the send signal 104 overlays an amplitude of the response signal 148 of the radio module. In other words, the send signal 104 overlays the response signal 148 of the radio module in the spectral range in terms of amplitude.

The signal As (first signal 110) may be an amplitude-modulated signal with which data may be transmitted from the reading device 100 towards the transponder 140. The additional signal Bs (second signal 112) may be a phase-modulated, frequency-modulated, or an OFDM-modulated (Orthogonal Frequency-Division Multiplexing) signal.

As already described above, the signals As (first signal 110) and Bs (second signal 112) may comprise different data rates. Depending on the selection of the modulation types and data rates of As (first signal 110) and Bs (second signal 112), the spectral characteristic of the signal Fs changes and, thus, the receive signal 116 of the reading device 100 changes as well as, in general, the signal of the air interface (Cs is primarily changed, on which Ds and Fs depend).

Figure 5:
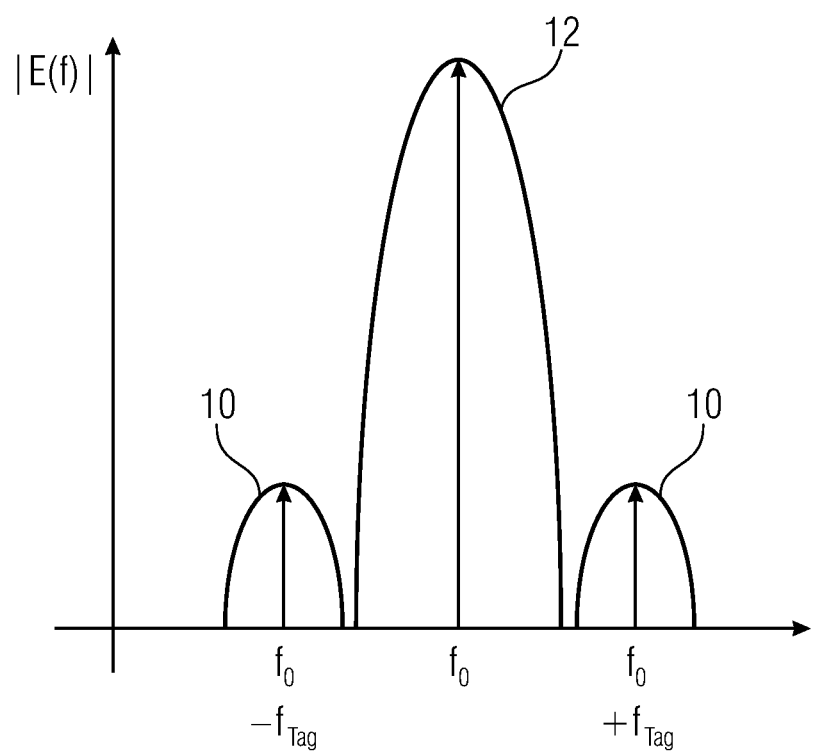
FIG. 5 shows in a diagram an amount of amplitude of a carrier signal and of a backscatter signal.

As an example for this, it is given that As (first signal 110) is amplitude-modulated and Bs (second signal 112) is phase-modulated. In this case, As specifies the data rate of the data signal Es to the radio module. Depending on the data rates of the signals, the following spectral characteristics result (this is an approximate and simplified illustration of the ratios):

data rate (As)>data rate (Bs): characteristic according to FIG. 5;
data rate (As)=data rate (Bs): characteristic according to FIG. 3; and
data rate (As)<data rate (Bs): characteristic according to FIG. 3.

In embodiments, the system 130 may be a wireless radio system.

In embodiments, the system 130 may be a backscatter system 130.

Embodiments may be extended by analog carrier suppression.

In embodiments, the signal As (first signal 110) may be periodical.

In embodiments, the signal Bs (second signal 112) may be a key with which the communication is protected, or masked.

In embodiments, channel estimation or signal estimation is not necessary for the suppression.

In embodiments, an additional signal (As or Bs or Cs) may be used in order to obtain the information for driving the carrier suppression.

Embodiments are able to support multiple receivers. Embodiments do not represent a limitation with respect to point-to-multipoint transmission (broadcasting method). However, by revealing the selected coding to certain receivers, groups may be formed which are enabled to receive. Consequently, simple selection of desired receivers from a larger number of existing receivers is possible.

In embodiments, the data rate of Es (data signal 146) may be selected to be smaller than half of the bandwidth of As (first signal 110) or Bs (second signal 112) so that, from a spectral perspective, Ds is below Cs (in-band communication). In embodiments, the data rate of Es (data signal 146) may also be selected to be larger, having the effect that a spectral characteristic as of a classical backscatter transmission results, see FIG. 5.

In embodiments, the signal portion of Cs (send signal 104) with which the data is transmitted towards the transponder, e.g., As (first signal 110), may be amplitude-modulated since the demodulation of an amplitude-modulated signal is realizable at the transponder 140 in the best and most energy-efficient manner.

In embodiments, the signal portion used for the carrier suppression, e.g., Bs (second signal 112) may be phase-modulated so that the synchronization of the data streams Bs (second signal 112) or Cs (send signal 104) and Fs (receive signal 116) may be realized before the subtraction via the phase. This, on the other hand, has an advantage with respect to the computation power. (In the classical in-band communication such as described in [2], this synchronization is mostly performed in the frequency range since, generally, OFDM signals are being synchronized).

In embodiments, demodulation of the signals may not be necessary for synchronizing Cs (send signal 104) and Fs (receive signal 116).

In embodiments, more energy may be transmitted from the reading device 100 to the transponder 140, resulting in an increased (energy) range.

In embodiments, due to the approach of carrier suppression, the transponder signal, from a spectral perspective, may be within the carrier signal, by which the energy demand of the transponder may be substantially reduced since an auxiliary carrier may be omitted, and, on the other hand, the range of the system may be increased. With this approach, an in-band full duplex communication may be realized for backscatter systems.

In embodiments, due to the higher range of the system and the additional available energy, new fields of application may be addressed which are not realizable with the system according to conventional technology.

Embodiments may be employed in any backscatter systems in which the accessible channel bandwidth is larger than the payload data range of the transponder.

Figure 4:
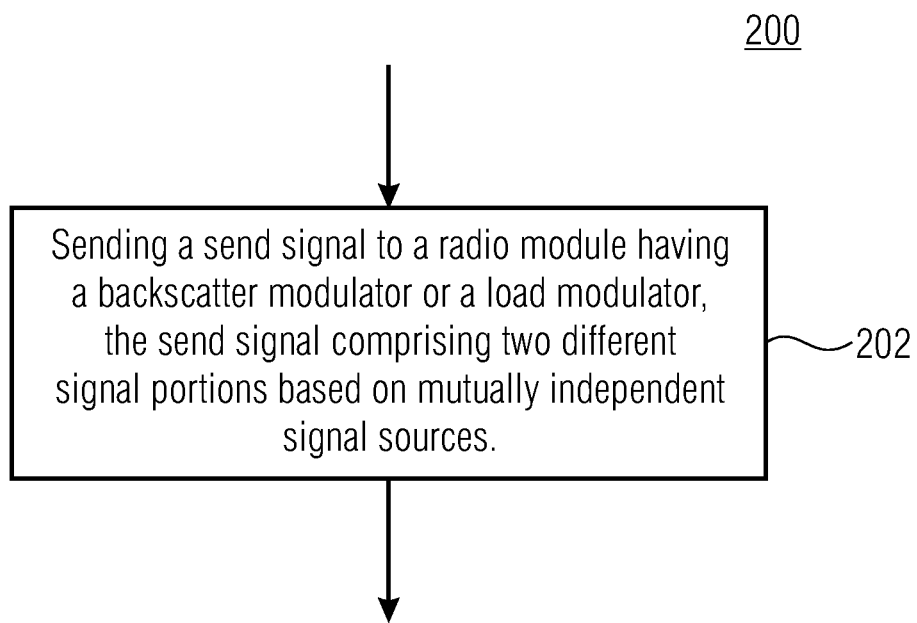
FIG. 4 shows a flowchart of a method according to an embodiment of the present invention.

FIG. 4 shows a flow diagram of a method 200 according to an embodiment. The method includes a step 202 of sending a send signal to a radio module having a backscatter modulator or load modulator, the send signal comprising two different signal portions based on mutually independent signal sources.

Embodiments of the present invention allow increasing of the energy range of a transponder (or even for maximizing the same), without worsening the communication range of a backscatter signal in the uplink.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed by a hardware device (or while using a hardware device), such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-transient, or non-temporary.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example.

The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU) or a graphics card (GPU), or may be a hardware specific to the method, such as an ASIC.

The above-described devices may, for example, be implemented using a hardware apparatus, or using a computer, or using a combination of a hardware apparatus and a computer.

The above-described devices or any components of the above-described devices may at least be partially implemented in a hardware and/or software (computer program).

The above-described methods may, for example, be implemented using a hardware apparatus, or using a computer, or using a combination of a hardware apparatus and a computer.

The above-described methods or any components of the above-described methods may at least be partially implemented in a hardware and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] Finkenzeller, K., "RFID Handbuch—Grundlagen und praktische Anwendungen von Transpondern, kontaktlosen Chipkarten und NFC", $7^{th}$ edition, Hanser Verlag, 2015.

[2] Sabharwal, A., Schnitter, P., Guo, D., Bliss, D. W., Rangarajan, S., Wichmann, R., "In-Band Full-Duplex Wireless: Challenges and Opportunities", 2014.

The invention claimed is:

1. A transceiver, comprising:
a transmitter configured to send a send signal to a radio module comprising a backscatter modulator or a load modulator;
the send signal comprising two different signal portions based on mutually independent signals;
wherein the send signal overlays a response signal of the radio module in the spectral range in terms of amplitude;
wherein the transmitter is implemented in hardware.

2. The transceiver according to claim 1, wherein the mutually independent signals are provided by mutually independent signal sources.

3. The transceiver according to claim 1, wherein the transceiver is configured to combine the two mutually independent signals in order to acquire the send signal.

4. The transceiver according to claim 1, wherein the two mutually independent signals are modulated independently of each other.

5. The transceiver according to claim 1, wherein data to be transmitted to the radio module comprising the backscatter modulator or load modulator is modulated only onto a first signal of the two mutually independent signals.

6. The transceiver according to claim 5, wherein a data rate of a transponder data signal Es is smaller than or equal to a data rate or the second signal.

7. The transceiver according to claim 5, wherein the first signal is amplitude-modulated and/or wherein the second signal is phase-modulated, frequency-modulated or OFDM-modulated.

8. The transceiver according to claim 1, wherein a first signal of the two mutually independent signals is a signal onto which data to be transmitted to the radio module comprising the backscatter modulator or load modulator is modulated, while a second signal of the two mutually independent signals serves for carrier suppression.

9. The transceiver according to claim 1, wherein the transceiver is configured to acquire a first signal of the two mutually independent signals from a first signal source and to acquire a second signal of the two mutually independent signals from a second signal source, the first signal source and the second signal source being mutually independent.

10. The transceiver according to claim 1, wherein the transceiver is configured to specify a modulation frequency to the radio module comprising the backscatter modulator or load modulator;

the bandwidth of the send signal being at least twice as high as a data rate of a response signal of the radio module comprising the backscatter modulator or load modulator.

11. The transceiver according to claim 1, wherein the transceiver comprises a receiver configured to receive a receive signal, the receive signal comprising a superimposition of the send signal and of a response signal sent out by the radio module in response to the send signal.

12. The transceiver according to claim 11, wherein the receiver is configured to synchronize the receive signal using a reference signal, the reference signal corresponding to the send signal or the second signal.

13. The transceiver according to claim 11, wherein the receiver is configured to offset the receive signal and the reference signal against each other in order to acquire the response signal sent out by the radio module.

14. The transceiver according to claim 13, wherein the transceiver comprises a demodulator configured to demodulate the response signal in order to acquire a data signal.

15. A system, comprising;
a transceiver according to claim 1; and
a radio module comprising a backscatter modulator or a load modulator, the radio module being configured to receive the send signal and to send out a backscatter-modulated or load-modulated signal as the response signal.

16. A method, comprising:
sending a send signal to a radio module comprising a backscatter modulator or a load modulator, the send signal comprising two different signal portions based on mutually independent signal sources;
wherein the send signal overlays a response signal of the radio module in the spectral range in terms of amplitude.

* * * * *